United States Patent
Vadera (10) Patent No.: US 9,330,383 B1
(45) Date of Patent: May 3, 2016

(54) MESSAGE DISPATCHER FOR PAYMENT SYSTEM

(71) Applicant: Square, Inc., San Francisco, CA (US)

(72) Inventor: Kshitiz Vadera, Toronto (CA)

(73) Assignee: Square, Inc., San Francisco, CA (US)

( * ) Notice: Subject to any disclaimer, the term of this patent is extended or adjusted under 35 U.S.C. 154(b) by 0 days.

(21) Appl. No.: 14/863,381

(22) Filed: Sep. 23, 2015

(51) Int. Cl.
*H04B 5/00* (2006.01)
*H04B 1/00* (2006.01)
*G06Q 20/00* (2012.01)
*G06Q 20/20* (2012.01)
*G06Q 20/32* (2012.01)
*G06Q 20/38* (2012.01)

(52) U.S. Cl.
CPC ............ *G06Q 20/202* (2013.01); *G06Q 20/204* (2013.01); *G06Q 20/3278* (2013.01); *G06Q 20/38* (2013.01)

(58) Field of Classification Search
USPC .......................................................... 705/17
See application file for complete search history.

(56) References Cited

U.S. PATENT DOCUMENTS

| | | | | |
|---|---|---|---|---|
| 8,284,061 B1* | 10/2012 | Dione | ................. | G06Q 30/0269 235/383 |
| 2006/0219776 A1* | 10/2006 | Finn | ........................ | B60R 25/25 235/380 |
| 2008/0121687 A1* | 5/2008 | Buhot | ..................... | G06Q 20/32 235/375 |
| 2008/0313047 A1* | 12/2008 | Casares | .................. | G06Q 20/10 705/17 |
| 2010/0136913 A1* | 6/2010 | Picquenot | .............. | G06Q 20/04 455/61 |
| 2010/0274712 A1* | 10/2010 | Mestre | ............. | G06K 19/07749 705/39 |
| 2011/0202415 A1* | 8/2011 | Casares | .................. | G06Q 20/20 705/17 |
| 2014/0081849 A1* | 3/2014 | Varvarezis | ........... | G06Q 20/327 705/39 |
| 2014/0138435 A1* | 5/2014 | Khalid | ................. | G06Q 20/227 235/380 |
| 2014/0256254 A1* | 9/2014 | Sarda | ........................ | G06F 9/54 455/41.1 |
| 2015/0178730 A1* | 6/2015 | Gleeson | ............. | G06Q 20/4012 705/72 |
| 2015/0287031 A1* | 10/2015 | Radu | ................... | G06K 7/10009 705/18 |

\* cited by examiner

*Primary Examiner* — Ashford S Hayles
(74) *Attorney, Agent, or Firm* — Maynard Cooper & Gale, P.C.; Joshua Van Hoven (57) ABSTRACT

A payment reader includes a contactless interface for communicating with a contactless device. The payment reader has a processor that executes instructions stored in memory, and the instructions include instructions for a plurality of firmware modules including a message dispatcher module and a plurality of functional modules. The functional modules generate messages and the message dispatcher module stores the messages in a queued data structure such as a stack or a queue. The messages are provided to the functional modules from the queued data structure. Some of the messages are timed messages that are returned to the queued data structure.

4 Claims, 6 Drawing Sheets

MESSAGE DISPATCHER FOR PAYMENT SYSTEM

BACKGROUND

Electronic transaction processing systems may utilize a payment card and a payment terminal. The payment card has a magnetic strip that is swiped at the payment terminal. The payment terminal reads payment information such as a credit card number from the magnetic strip and transmits the payment information along with information relating to the transaction to a remote transaction server. The remote transaction server determines whether the transaction is approved and provides a response to the payment terminal. Such electronic transaction processing systems have been found to be susceptible to fraud. For example, the magnetic strip of the payment card provides the credit card number to payment terminal without encryption, such that this information can be acquired from either the payment card or the payment terminal.

Payment techniques have been developed that reduce the possibility of fraudulent transactions. A Europay/Mastercard/Visa ("EMV") system may be implemented with a passive electronic chip that is a component of the payment card. Power is provided to the passive electronic circuit by a payment terminal that either physically engages with the passive electronic circuit or that provides power by inductive coupling of a wireless carrier signal that is transmitted by the payment terminal. The passive electronic circuit of the payment card activates and communicates with the payment terminal via the physical interface or by modulation of the wireless carrier signal. Payment information is encrypted by the passive electronic circuit prior to transmission to the payment terminal.

Near field communication ("NFC") systems facilitate the transfer of data between electronic devices such as smart phones, smart watches, and tablets. NFC payment systems have been implemented in which an electronic device communicates payment information with a payment terminal that provides a wireless carrier signal. The electronic device and payment terminal communicate by modulating the wireless carrier signal. As with EMV payment systems, the NFC-enabled device may transmit payment information to the payment terminal in encrypted form. A payment terminal that processes EMV or NFC payment transactions may include specialized software for processing transactions between a chip card or electronic device and a remote payment server.

BRIEF DESCRIPTION OF THE DRAWINGS

The above and other features of the present disclosure, its nature and various advantages will be more apparent upon consideration of the following detailed description, taken in conjunction with the accompanying drawings in which.

DETAILED DESCRIPTION

A payment reader provides an interface between a point-of-sale application and a payment device such as an EMV chip card or an NFC payment device. A payment transaction is initiated such as by a merchant running the point-of-sale application on a mobile device. The point-of-sale application communicates with the payment reader through a communication interface, and the payment reader proceeds to process the transaction. The payment reader initiates communication with the payment device using near field communications or, if the customer has inserted the chip card in a slot of the payment reader, via a direct electrical connection with the chip card. During the time that the payment reader is waiting for the payment device to provide payment information, it will also perform other functions such as communicating with the point-of-sale application and operating other components of the payment reader.

Once the payment information is received from the payment device, the payment reader will process the transaction in accordance with a transaction processing procedure. For example, the payment reader may select a transaction processing procedure based on the type of payment that is provided by the user (e.g., Visa, Mastercard, etc.). The payment reader will then process the payment according to the transaction processing procedure, including encrypting payment information for eventual communication to a payment server. The payment reader communicates with the point-of-sale application (e.g., using a wireless connection such as Bluetooth) and the point-of-sale application communicates with a payment server via a communication connection such as an internet protocol (IP) connection. The payment server determines whether the transaction is approved and communicates this back to the point-of-sale application and the payment reader.

The payment reader has a memory that stores instructions for performing the functions of the payment reader and a processing unit for executing those instructions. The instructions are implemented in firmware and are divided into a number of firmware modules. The firmware modules include a message dispatcher module and functional modules. Each of the functional modules is associated with a different function of the payment reader, such as a payment application module having instructions for handling payments and interfacing with other devices, a contactless module having instructions for operating the contactless NFC communication interface, a contact module having instructions for operating the contact interface, a transaction processing module having instructions for transaction processing procedures, a cryptography module having instructions for performing encryption, and a communication module having instructions for operating a communications interface (e.g., for communicating with the point-of-sale application).

The message dispatcher module coordinates the execution of the functional modules. During their operation, the functional modules generate messages. These messages include message identifiers ("message IDs") that indicate the type of message that is being provided. The message dispatcher generates a queued data structure that includes messages, such as a circular queue of messages or a push and pop stack of messages. When a message reaches the appropriate position within the queued data structure, the message dispatcher provides the message to one or more of the functional modules. When a functional module determines that it should perform some operations in response to the message ID, it executes its instructions. When processing is complete, the functional module sets a flag within the message. The message dispatcher module removes the message from the queued data structure and moves on to the next message.

Some messages may be timed messages that enable concurrent processing. For example, timed messages may be used where a functional module is likely to take an extended amount of time for its processing. For example, a payment module such as a contactless module or a contact module executes instructions for interfacing with the chip card or NFC-enabled electronic device. The timing for when these communications occur depends on the user placing the chip card or NFC-enabled electronic device in the appropriate location relative to the payment reader. Thus, timed messages may provide a mechanism for invoking the contactless module and contact module with a delay such that the chip card or NFC-enabled electronic device is in the appropriate location to communicate with the payment reader. Other messages may be processed concurrently by the other functional modules until the timed message is invoked.

A timed message includes a timing value. The message dispatcher uses this timing value to determine when and how to distribute the message to the functional modules. In one embodiment, the timing value may determine when the timed message should be distributed to the queued data structure. Whenever the timed message arrives at the start of the queued data structure, it is determined whether the timing value is expired (e.g., based on a comparison of an elapsed time since the timed message was created to the timing value). Until the timing value is expired, the timed message is returned to the queue. Once distributed, the timed message is returned to the queued data structure if neither the contactless module nor the contact module indicates that processing should stop (e.g., by indicating that processing is complete or that an error occurred). In another embodiment, the timing value may determine how long the timed message should continue to be distributed to the functional modules and returned to the queue. Whenever the timed message arrives at the start of the queued data structure, it is distributed to the functional modules. Until the timing value is expired or the message is processed, the message is automatically returned to the queued data structure. Once the timing value is expired, the message is removed from the queue, and an error may be indicated.

Figure 1:
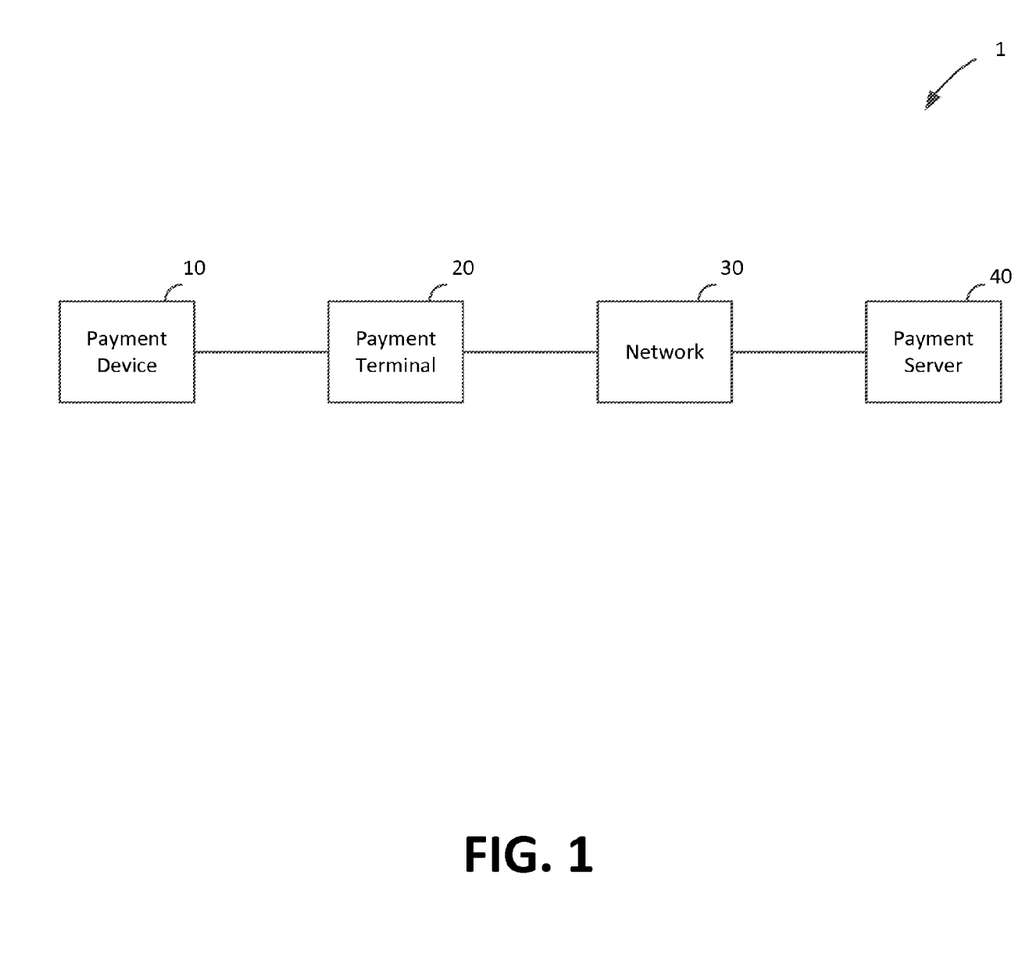
FIG. 1 shows an illustrative block diagram of a payment system in accordance with some embodiments of the present disclosure.

FIG. 1 depicts an illustrative block diagram of a payment system 1 in accordance with some embodiments of the present disclosure. In one embodiment, payment system 1 includes a payment device 10, payment terminal 20, network 30, and payment server 40. These components of payment system 1 facilitate electronic payment transactions between a merchant and a customer.

The electronic interactions between the merchant and the customer take place between the customer's payment device 10 and the merchant's payment terminal 20. The customer has a payment device 10 such as a credit card having magnetic stripe, a credit card having an EMV chip, or a NFC-enabled electronic device such as a smart phone running a payment application. The merchant has a payment terminal 20 such as a payment terminal or other electronic device that is capable of processing payment information (e.g., encrypted payment card data and user authentication data) and transaction information (e.g., purchase amount and point-of-purchase information), such as a smart phone or tablet running a payment application.

In some embodiments (e.g., for low-value transactions or for payment transactions that are less than a payment limit indicated by a NFC or EMV payment device 10) the initial processing and approval of the payment transaction may be processed at payment terminal 20. In other embodiments, payment terminal 20 may communicate with payment server 40 over network 30. Although payment server 40 is depicted as a single simplified block, it will be understood that payment server 40 may include any suitable number of servers operated by any suitable entities, such as a payment service system and one or more banks of the merchant and customer. The payment terminal 20 and the payment server 40 communicate payment and transaction information to determine whether the transaction is authorized. For example, payment terminal 20 may provide encrypted payment data, user authentication data, purchase amount information, and point-of-purchase information to payment server 40 over network 30. Payment server 40 may determine whether the transaction is authorized based on this received information as well as information relating to customer or merchant accounts, and responds to payment terminal 20 over network 30 to indicate whether or not the payment transaction is authorized. Payment server 40 may also transmit additional information such as transaction identifiers to payment terminal 20.

Based on the information that is received at payment terminal 20 from payment server 40, the merchant may indicate to the customer whether the transaction has been approved. In some embodiments such as a chip card payment device, approval may be indicated at the payment reader, for example, at a screen of a payment terminal. In other embodiments such as a smart phone or watch operating as an NFC payment device, information about the approved transaction and additional information (e.g., receipts, special offers, coupons, or loyalty program information) may be provided to the NFC payment device for display at a screen of the smart phone or watch or storage in memory.

Figure 2:
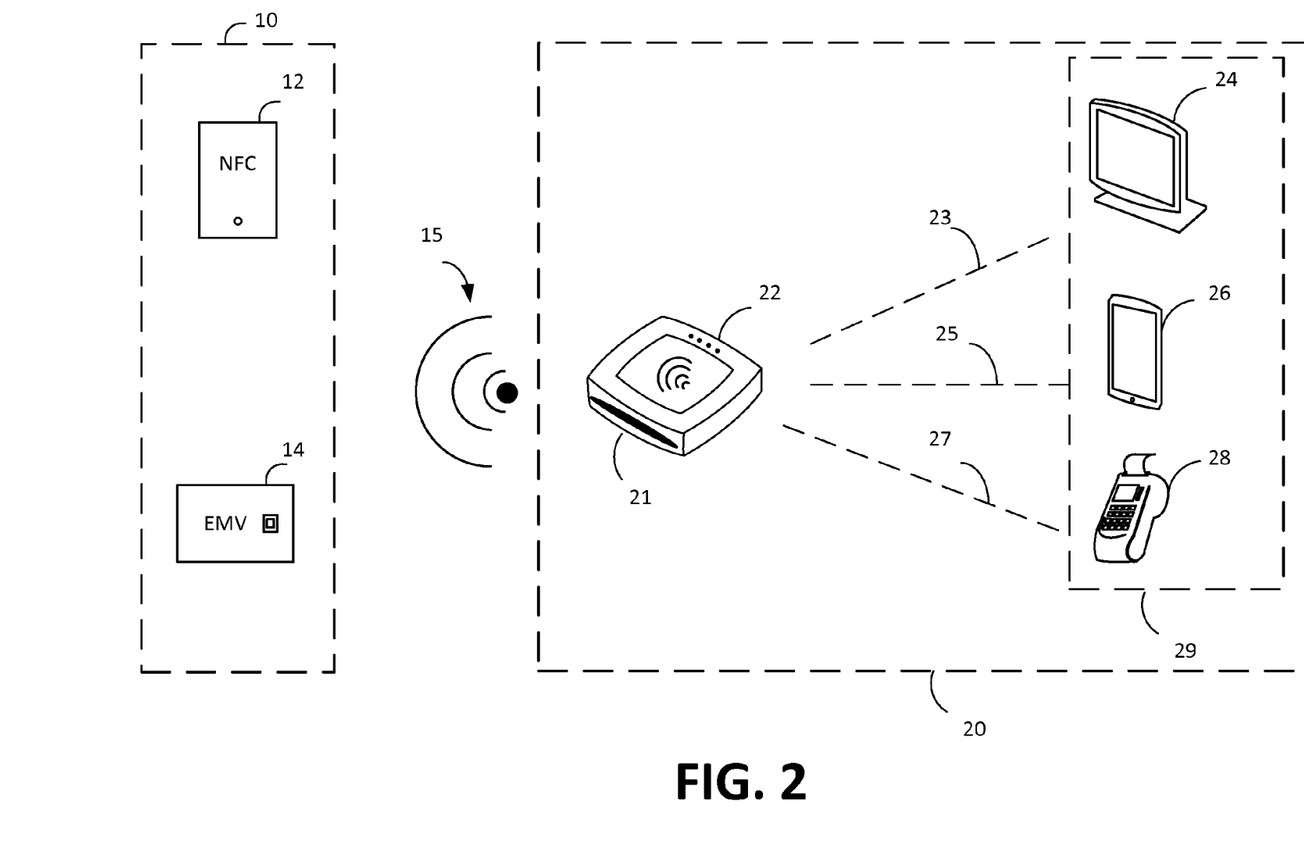
FIG. 2 depicts an illustrative block diagram of a payment device and payment reader in accordance with some embodiments of the present disclosure.

FIG. 2 depicts an illustrative block diagram of payment device 10 and payment reader 20 in accordance with some embodiments of the present disclosure. Although it will be understood that payment device 10 and payment reader 20 of payment system 1 may be implemented in any suitable manner, in one embodiment the payment reader 20 may comprise a payment reader 22 and merchant device 29. The reader 22 of payment terminal 20 may facilitate transactions between the payment device 10 and a merchant device 29 running a point-of-sale application.

In one embodiment, payment device 10 may be a device that is capable of communicating with payment terminal 20 (e.g., via payment reader 22), such as an NFC device 12 or an EMV chip card 14. Chip card 14 may include a secure integrated circuit that is capable of communicating with a payment terminal such as payment terminal 20, generating encrypted payment information, and providing the encrypted payment information as well as other payment or transaction information (e.g., transaction limits for payments that are processed locally) in accordance with one or more electronic payment standards such as those promulgated by EMVCo. Chip card 14 may include contact pins for communicating with payment reader 22 (e.g., in accordance with ISO 7816) and in some embodiments, may be inductively coupled to payment reader 22 via a near field 15. A chip card 14 that is inductively coupled to payment reader 22 may communicate with payment reader 22 using load modulation of a wireless carrier signal that is provided by payment reader 22 in accordance with a wireless communication standard such as ISO 14443.

NFC device 12 may be an electronic device such as a smart phone, tablet, or smart watch that is capable of engaging in secure transactions with payment terminal 20 (e.g., via communications with payment reader 22). NFC device 12 may have hardware (e.g., a secure element including hardware and executable code) and/or software (e.g., executable code operating on processor in accordance with a host card emulation routine) for performing secure transaction functions. During a payment transaction NFC device 12 may be inductively coupled to payment reader 22 via near field 15 and may communicate with payment terminal 20 by active or passive load modulation of a wireless carrier signal provided by payment reader 22 in accordance with one or more wireless communication standards such as ISO 14443 and ISO 18092.

Although payment terminal 20 may be implemented in any suitable manner, in one embodiment payment terminal 20 may include a payment reader 22 and a merchant device 29. The merchant device 29 runs a point-of-sale application that provides a user interface for the merchant and facilitates communication with the payment reader 22 and the payment server 40. Payment reader 22 may facilitate communications between payment device 10 and merchant device 29. As described herein, a payment device 10 such as NFC device 12 or chip card 14 may communicate with payment reader 22 via inductive coupling. This is depicted in FIG. 2 as near field 15, which comprises a wireless carrier signal having a suitable frequency (e.g., 13.56 MHz) emitted from payment reader 22.

In one embodiment, payment device 10 may be a contactless payment device such as NFC device 12 or chip card 14, and payment reader 22 and the contactless payment device 10 may communicate by modulating the wireless carrier signal within near field 15. In order to communicate information to payment device 10, payment reader 22 changes the amplitude and/or phase of the wireless carrier signal based on data to be transmitted from payment reader 22, resulting in a wireless data signal that is transmitted to the payment device. This signal is transmitted by an antenna of payment reader 22 that is tuned to transmit at 13.56 MHz, and if the payment device 10 also has a suitably tuned antenna within the range of the near field 15 (e.g., 0 to 10 cm), the payment device receives the wireless carrier signal or wireless data signal that is transmitted by payment reader 22. In the case of a wireless data signal, processing circuitry of the payment device 10 is able to demodulate the received signal and process the data that is received from payment reader 22.

When a contactless payment device such as payment device 10 is within the range of the near field 15 it is inductively coupled to the payment reader 22. Thus, the payment device 10 is also capable of modulating the wireless carrier signal via active or passive load modulation. By changing the tuning characteristics of the antenna of payment device 10 (e.g. by selectively switching a parallel load into the antenna circuit based on modulated data to be transmitted) the wireless carrier signal is modified at both the payment device 10 and payment reader 22, resulting in a modulated wireless carrier signal. In this manner, the payment device is capable of sending modulated data to payment reader 22.

In some embodiments, payment reader 22 also includes an EMV slot 21 that is capable of receiving chip card 14. Chip card 14 may have contacts that engage with corresponding contacts of payment reader 22 when chip card 14 is inserted into EMV slot 21. Payment reader 22 provides power to an EMV chip of chip card 14 through these contacts and payment reader 22 and chip card 14 communicate through a communication path established by the contacts.

Payment reader 22 may also include hardware for interfacing with a magnetic strip card (not depicted in FIG. 2). In some embodiments, the hardware may include a slot that guides a customer to swipe or dip the magnetized strip of the magnetic strip card such that a magnetic strip reader can receive payment information from the magnetic strip card. The received payment information is then processed by the payment reader 22.

Merchant device 29 may be any suitable device such as tablet payment device 24, mobile payment device 26, or dedicated payment terminal 28. In the case of a computing device such as tablet payment device 24 or mobile payment device 26, a point-of-sale application may provide for the entry of purchase and payment information, interaction with a customer, and communications with a payment server. For example, a payment application may provide a menu of services that a merchant is able to select and a series of menus or screens for automating a transaction. A payment application may also facilitate the entry of customer authentication information such as signatures, PIN numbers, or biometric information. Similar functionality may also be provided on a dedicated payment terminal 28.

Merchant device 29 may be in communication with payment reader 22 via a communication path 23/25/27. Although communication path 23/25/27 may be implemented via a wired (e.g., Ethernet, USB, FireWire, lightning) or wireless (e.g., Wi-Fi, Bluetooth, NFC, or ZigBee) connection, in one embodiment payment reader 22 may communicate with the merchant device 29 via a Bluetooth or Bluetooth low energy interface. As described herein, in some embodiments processing of the payment transaction may occur locally on payment reader 22 and merchant device 29, for example, when a transaction amount is small or there is no connectivity to the payment server. In other embodiments, merchant device 29 or payment reader 22 may communicate with payment server 40 via a public or dedicated communication network 30. Although communication network 30 may be any suitable communication network, in one embodiment communication network 30 may be the internet and payment and transaction information may be communicated between payment terminal 20 and payment server 40 in an encrypted format.

Figure 3:
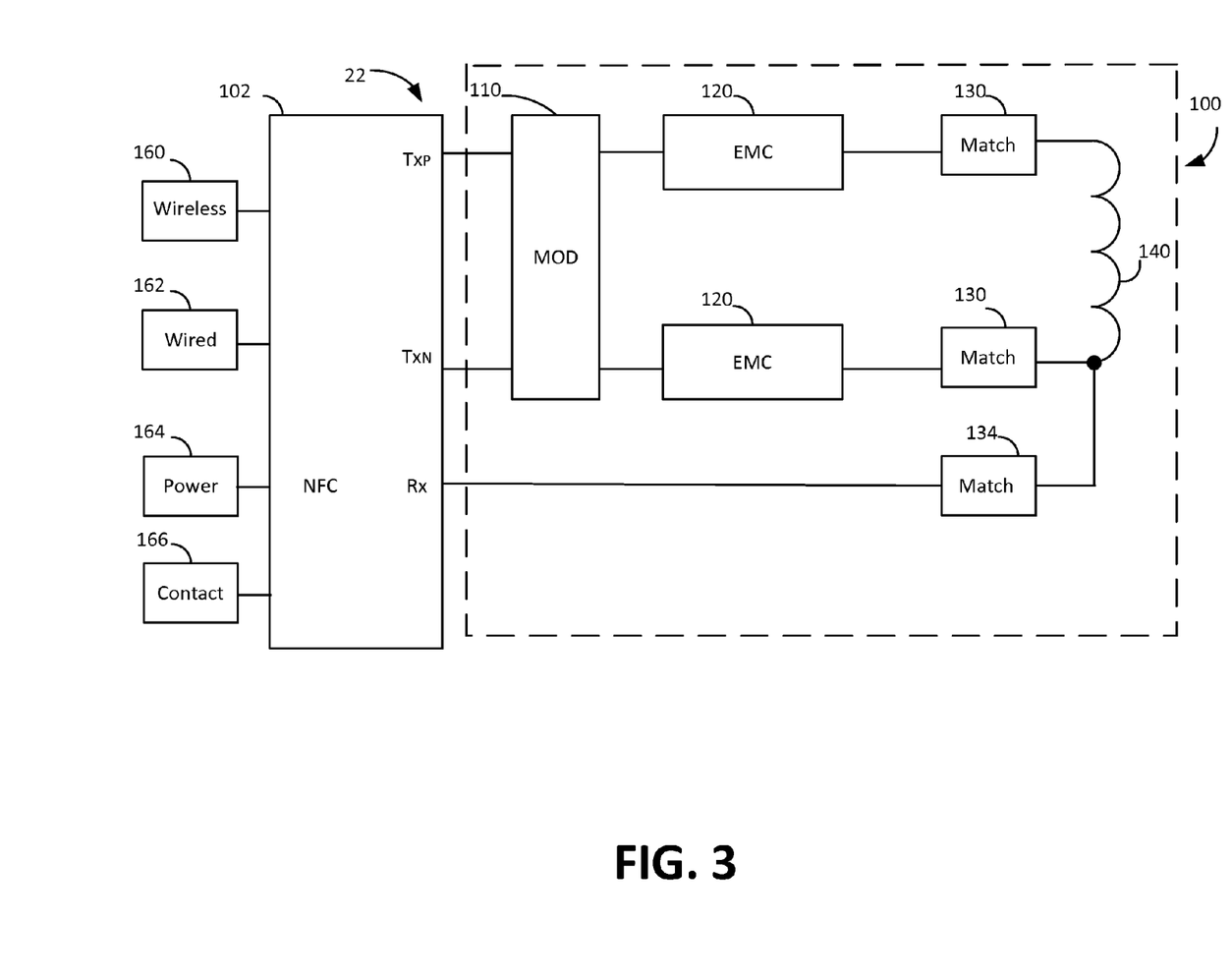
FIG. 3 depicts a block diagram of a payment reader in accordance with some embodiments of the present disclosure.

FIG. 3 depicts a block diagram of payment reader 22 in accordance with some embodiments of the present disclosure. Although particular components are depicted in a particular arrangement in FIG. 3, it will be understood that payment reader 22 may include additional components, one or more of the components depicted in FIG. 3 may not be included in payment reader 22, and the components of payment reader 22 may be rearranged in any suitable manner. Among other functions, payment reader 22 may operate as a NFC communication device for exchanging data with a contactless payment device such payment device 10. In one embodiment, payment reader 22 includes NFC chip 102, NFC circuit 100, wireless communication interface 160, wired communication interface 162, power supply 164, and contact interface 166. Although the NFC circuit 100 and the contact interface 166 are examples of types of payment interfaces that may be included within payment reader 22, it will be understood that any suitable payment interface (e.g., a magnetic card reader) may be included within payment reader 22 in accordance with the embodiments of the present disclosure.

NFC chip 102 of payment reader 22 may include any suitable hardware, software, memory, and circuitry as is necessary to perform and control the functions of payment reader 22. In one embodiment, NFC chip 102 includes one or more processors that execute instructions stored in memory of NFC chip 102 to control the operations and processing of payment reader 22. As used herein, a processor may include one or more processors having processing capability necessary to perform the processing functions described herein, including but not limited to hardware logic, computer readable instructions running on a processor, or any suitable combination thereof. A processor may run software to perform the operations described herein, including software accessed in machine readable form on a tangible non-transitory computer readable storage medium, as well as software that describes the configuration of hardware such as hardware description language (HDL) software used for designing chips.

In one embodiment, NFC chip 102 may include two RISC processors configured to perform general processing and cryptographic processing functions, respectively, based on executable instructions stored in respective memory. As used herein, memory may refer to a tangible or non-transitory storage medium. Examples of tangible (or non-transitory) storage medium include disks, thumb drives, and memory, etc., but does not include propagated signals. Tangible computer readable storage medium include volatile and non-volatile, removable and non-removable media, such as computer readable instructions, data structures, program modules or other data. Examples of such media include RAM, ROM, EPROM, EEPROM, SRAM, flash memory, disks or optical storage, magnetic storage, or any other non-transitory medium that stores information that is accessed by a processor or computing device.

NFC chip 102 may also include additional circuitry such as interface circuitry, analog front end circuitry, and security circuitry. In one embodiment, interface circuitry may include circuitry for interfacing with a wireless interface 160 (e.g., Wi-Fi, Bluetooth, and Bluetooth low energy), circuitry for interfacing with a wired interface 162 (e.g., USB, Ethernet, FireWire, and lightning), circuitry for interfacing with other communication interfaces or buses (e.g., I²C, SPI, UART, and GPIO), circuitry for interfacing with power interface 164 (e.g., power management circuitry, power conversion circuitry, rectifiers, and battery charging circuitry), and circuitry for interfacing with contact interface 166 (e.g., power and communication circuitry for interfacing with an EMV chip of a chip card 14).

In one embodiment, analog front end circuitry of NFC chip 102 includes circuitry for interfacing with the analog components of NFC circuit 100 (e.g., electromagnetic compatibility (EMC) circuitry, matching circuits, and modulation circuitry). Security circuitry of NFC chip 102 may include the circuitry for protecting sensitive information such as encryption keys, merchant information, and customer information. In one embodiment, security circuitry may include tamper protection circuitry and electronic fuses for selectively cutting off power or disabling one or more components of NFC chip in response to attempts to obtain improper access to NFC chip 102, as described in more detail herein.

Wireless interface 160 includes hardware and software for communicating with external electronic devices wirelessly, such as Wi-Fi, Bluetooth, or Bluetooth low energy. Wired Interface 162 includes hardware, software, and a physical interface to facilitate wired communications with an external electronic device via an interface such as USB, Ethernet, FireWire, or lightning. Using the wireless interface 116 and wired interface 162, payment reader 22 may communicate with external electronic devices such as a merchant device 29. In some embodiments, payment reader 22 may communicate with other electronic devices such as a remote server, (e.g., to provide payment or transaction information directly to the server, receive updates from a server, or communicate certification or approval data with the server), or with another electronic device.

Power supply 164 may include one or more power supplies such as a physical connection to AC power or a battery. Power supply 164 may include power conversion circuitry for converting AC power and/or generating a plurality of DC voltages for use by components of payment reader 22. When power supply 164 includes a battery, the battery may be charged via a physical power connection, via inductive charging, or via any other suitable method.

Contact interface 166 may be a suitable interface for providing power to a payment chip such as an EMV chip of a chip card 14 and communicating with the EMV chip. Contact Interface 166 may include a plurality of contact pins for physically interfacing with the chip card 14 according to EMV specifications.

NFC chip 102 of payment reader 22 is in communication with NFC circuit 100 via a plurality of pins such as a positive transmit pin ($T_{XP}$), negative transmit pin ($T_{XN}$), and a receive pin ($R_X$). Transmit pins $T_{XP}$ and $T_{XN}$ may provide output signals having an amplitude, frequency, and waveform. In one embodiment, the signals provided from $T_{XP}$ and $T_{XN}$ may be differential square wave signals and may be provided to modulation circuitry 110 of NFC circuit 100.

Modulation circuit 110 may include circuitry (e.g., H-bridge circuitry) for outputting a modulated signal in accordance with the outputs of $T_{XP}$ and $T_{XN}$. Modulation circuit 110 may also perform other functions such as applying an increased voltage that is suitable for transmission over antenna 140. The output of modulation circuit 110 may be provided to EMC circuit 120. EMC circuit 120 may include one or more components such inductors and capacitors in order to provide acceptable electromagnetic compatibility with other high-frequency signals. The output of EMC circuit 120 may be provided to matching circuit 130. Matching circuit 130 may include suitable components such as resistors, inductors, and capacitors to provide for impedance matching and tuning of antenna 140.

Collectively, the modulation circuit 110, EMC circuit 120, and matching circuit 130 may form a transmit circuit that is coupled to antenna 140. However, it will be understood that the transmit circuit may include any suitable circuitry that couples the NFC chip 102 (e.g., the outputs of the processing unit thereof as indicated by the $T_{XP}$ and $T_{XN}$ pins), that the circuit components depicted in FIG. 3 may be arranged in any suitable manner, and that any suitable components may be added or omitted therefrom.

During operation of NFC chip 102 of payment reader 22, transmit pins $T_{XP}$ and $T_{XN}$ may output either a carrier signal or a modulated signal. A carrier signal may be a signal having a fixed frequency such as 13.56 MHZ. The carrier signal is provided to modulation circuit 110 which may modify the output signal from NFC chip 102 in a uniform manner (e.g., by applying a voltage boost). Components of EMC circuit 120 and matching circuit 130 (e.g., resistors, inductors, and capacitors) modify the output waveform of the carrier signal, for example, by modifying the approximate square wave output such that the signal transmitted by the antenna 140 approximates a sine wave having the carrier frequency. A first portion of the transmit circuit thus couples the output of the $T_{XP}$ pin to a first terminal of antenna 140 while a second portion of the transmit circuit couples the output of the $T_{XN}$ pin to a second terminal of antenna 140. The carrier signal is then transmitted over antenna 140 as a wireless carrier signal.

When modulation is applied to the carrier signal by NFC chip 102, modulation circuit 110 may output a modulated signal that varies from the carrier signal in its amplitude, phase, or both in response to a data signal. As is described herein, NFC chip 102 may implement a modulation procedure in order to generate the modulated signal, either alone or in combination with the modulation circuit 110. This modulated signal is provided to the transmit circuit and transmitted over antenna 140 as a wireless data signal.

NFC chip 102 monitors the signal at antenna 140 through receive pin $R_X$. The receive pin $R_X$ is coupled to a receive circuit, which in one embodiment may include matching circuit 134 and may be coupled to a second terminal of antenna 140. In this manner, NFC chip 102 may monitor what is being transmitted (e.g., the wireless carrier and modulated signals) as well as changes that are applied to the carrier signal by a contactless payment device 10 such as NFC device 12 or chip card 14. Based on these modulations of the received signal, NFC chip 102 is able to receive communications from the contactless payment device 10.

Figure 4:
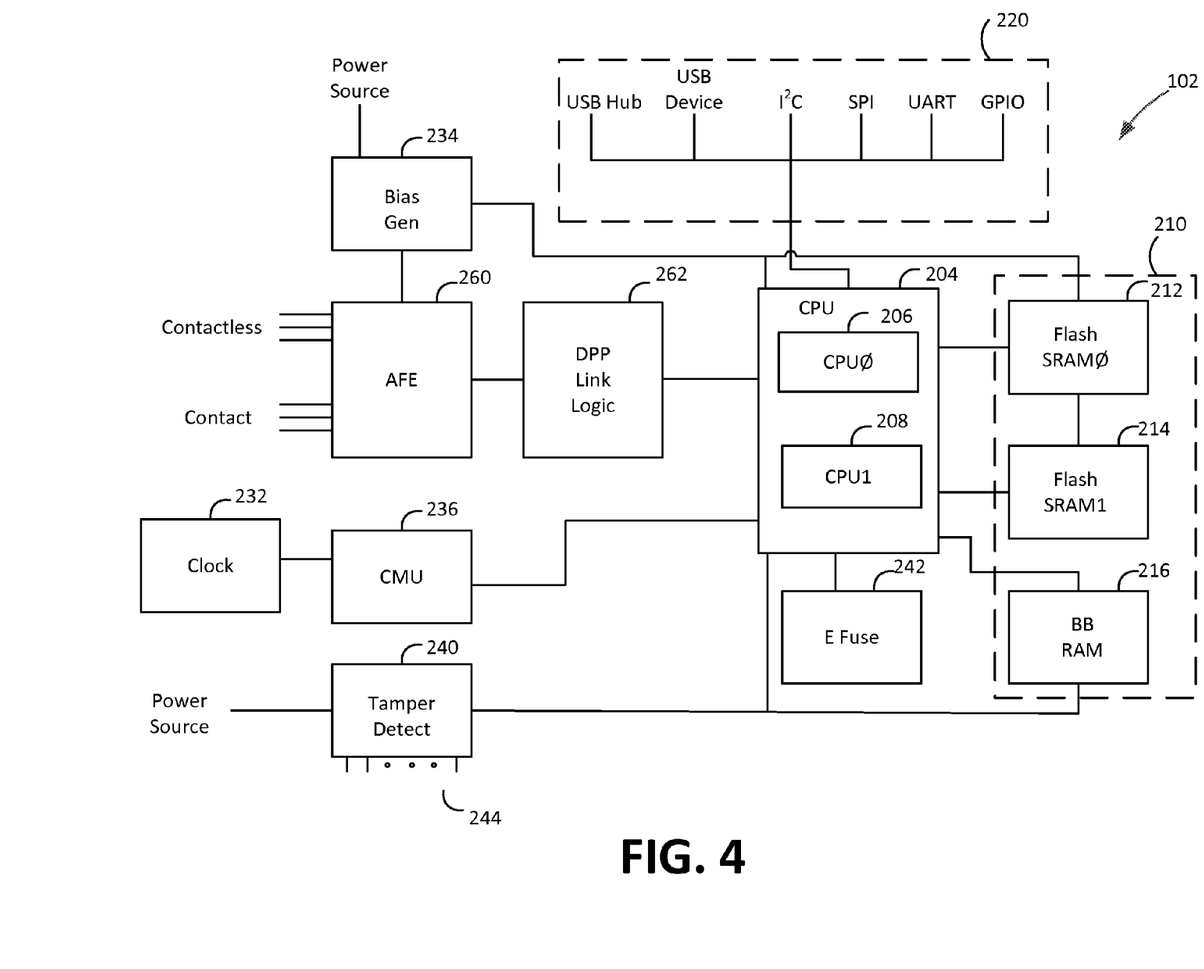
FIG. 4 depicts a block diagram of components of an NFC chip in accordance with some embodiments of the present disclosure.

FIG. 4 depicts a block diagram of components of NFC chip 102 in accordance with some embodiments of the present disclosure. Although particular components are depicted in a particular configuration in FIG. 4, it will be understood that NFC chip 102 may include additional components, certain components may not be included in NFC chip 102, and components of NFC chip 102 may be rearranged in any suitable manner.

In one embodiment, NFC chip 102 may include a processing unit 204 and memory 210. In one embodiment, processing unit 204 may include two CPUs labeled as CPU0 206 and CPU1 208. CPU0 206 may be a general processor that controls most functions of the NFC chip 102. CPU 208 may be a cryptographic processor that is physically separated from other components of NFC chip 102 (not depicted) such that even if one or more components of NFC chip 102 (e.g., CPU0 206) are compromised, the processor CPU1 208 and its associated memory (e.g., flash SRAM1 214) of the cryptographic unit may not be compromised.

In one embodiment, CPU0 206 and CPU1 208 may be RISC processors. Although memory 210 may include a suitable memory, in one embodiment each of CPU0 206 and CPU1 208 may have associated flash SRAM such as flash SRAM0 212 and flash SRAM1 214, respectively. Flash SRAM0 212 and flash SRAM1 214 may store instructions for execution on respective CPUs CPU0 206 and CPU1 208 and may also store data for use during operation of NFC chip 102. Battery-backed RAM 216 may be a separate memory that stores highly sensitive information such as encryption keys. In this manner, if NFC chip 102 is compromised, the information stored in battery-backed RAM 216 may be erased, for example, by removing power to battery-backed RAM 216.

Processing unit 204 (e.g., CPU0 206 of processing unit 204) may interface with one or more communication interfaces 220. Communication interfaces 220 may enable communication with external devices and other circuitry of payment reader 22. For example, communication interfaces 220 may enable communications with circuitry of payment reader 22 such as wireless communication circuitry (e.g., Wi-Fi, Bluetooth, Bluetooth low energy), power management circuitry of payment reader 22, wired communication interfaces of payment reader 22 (e.g., Ethernet, USB, FireWire, lightning) and other components of payment reader 22. Exemplary communication interfaces 220 include a USB hub, USB device, I²C, SPI, UART, and GPIO.

NFC chip 102 also includes bias generator 234, clock 232, clock management unit 236, tamper detect circuit 240, and electronic fuse 242. Bias generator 234 may be connected to a power source and may generate a bias voltage that is provided to components of NFC chip 102 such as analog front end 260, processing unit 204, and memory 210. In one embodiment, a suitable bias voltage generated by bias generator 234 may be 3.3 volts. Clock 232 may be any suitable clock such as crystal oscillator and may provide a clock signal at a clock frequency to clock management unit 236. Clock management unit 236 may generate a plurality of clock signals based on the input from clock 232, for example, to provide a clock signal for CPU0 206 and CPU1 208 of processing unit 204 and a clock signal having a suitable frequency for transmission for near field communications (e.g., 13.56 MHZ).

Tamper detect 240 is connected to the power source. Tamper detect 240 includes tamper detect inputs 244 which may be coupled to one or more electrical or physical components of NFC chip 102 or payment reader 22. If one of these inputs indicates that there has been attempt to tamper with one or more components of payment reader 22, tamper detect 240 may shut off power to one or more components of NFC chip 102. Although tamper detect 240 is depicted in communication with only processing unit 204 and battery backup RAM 216, it will be understood that tamper detect 240 may provide interruption of power to any other component of NFC chip 102 such as flash SRAM0 212 and flash SRAM1 214.

NFC chip 102 also includes electronic fuses 242. Electronic fuses 242 may be provided to disable power or communications to one or more components of NFC chip 102. For example, electronic fuses 242 may be controlled by CPU1 208. In the event that an improper access attempt or usage of NFC chip 102 is identified by CPU1 208, CPU1 may activate one or more electronic fuses 242 in order to shut off power to one or more components of NFC chip 102, to shut off the clock signal to one or more components of NFC chip 102, or to shut off communications between one or more components of NFC chip 102. For example, CPU1 208 may control a subset of electronic fuses 242 in a manner such that CPU0 206 is unable to operate or communicate with CPU1 208.

NFC chip 102 also includes analog front end 260 and DPP link logic 262. DPP link logic 262 may provide an interface between the digital signals from CPU0 206 of processing unit 204 and the analog signals of analog front end 260. Analog front end 260 provides the interface to the contactless interface (e.g., the NFC circuit 100) and to a contact interface for chip cards.

During operation, clock 232 provides a clock signal to CMU 236, which provides a plurality of clock signals to processing unit 204. Tamper detect 240 monitors inputs 244, and in the absence of a tamper attempt power may be supplied to components of NFC chip 102 in a normal manner. In the absence of any improper attempt to access NFC chip 102, CPU1 208 may control electronic fuse 242 such that the components of NFC chip 102 are able to operate normally.

The merchant device 29 may be in communication with Bluetooth communication circuitry of payment reader 22, which may be in communication with CPU0 206 via communication interface 220. In one embodiment, merchant device 29 may transmit a request to receive payment to NFC chip 102 which may be received by CPU0 206. CPU0 206 may process the request according to instructions stored in flash SRAM0 212 and may activate one or both of the contactless interface (e.g., NFC circuit 100) or the contact interface via DPP link logic 262 and analog front end 260. With respect to the contactless interface, CPU0 206 may function as in a near field communication initiator, providing a carrier signal and modulated signal via DPP link logic 262, analog front end 260, and contactless interface. CPU0 206 may monitor for a response from a target (e.g., NFC device 12 or EMV device 14) via the contactless interface, analog front end 260, and DPP link logic 262.

Once communication is established with a payment device such as either a contactless device (e.g., an NFC device or a chip card) via the contactless circuit or a contact card via the contact interface, CPU0 206 may communicate with the payment device to process a payment transaction. During this process CPU0 206 may communicate with CPU1 208 in order for CPU 208 to perform cryptographic functions. In some embodiments, CPU0 206 and CPU1 208 may process a transaction locally, while in some embodiments CPU0 206 may communicate with the merchant device 29 or directly with a payment server 40 via communication interface 220 and associated communication circuits (e.g., Wi-Fi, Bluetooth, Ethernet).

Figure 5:
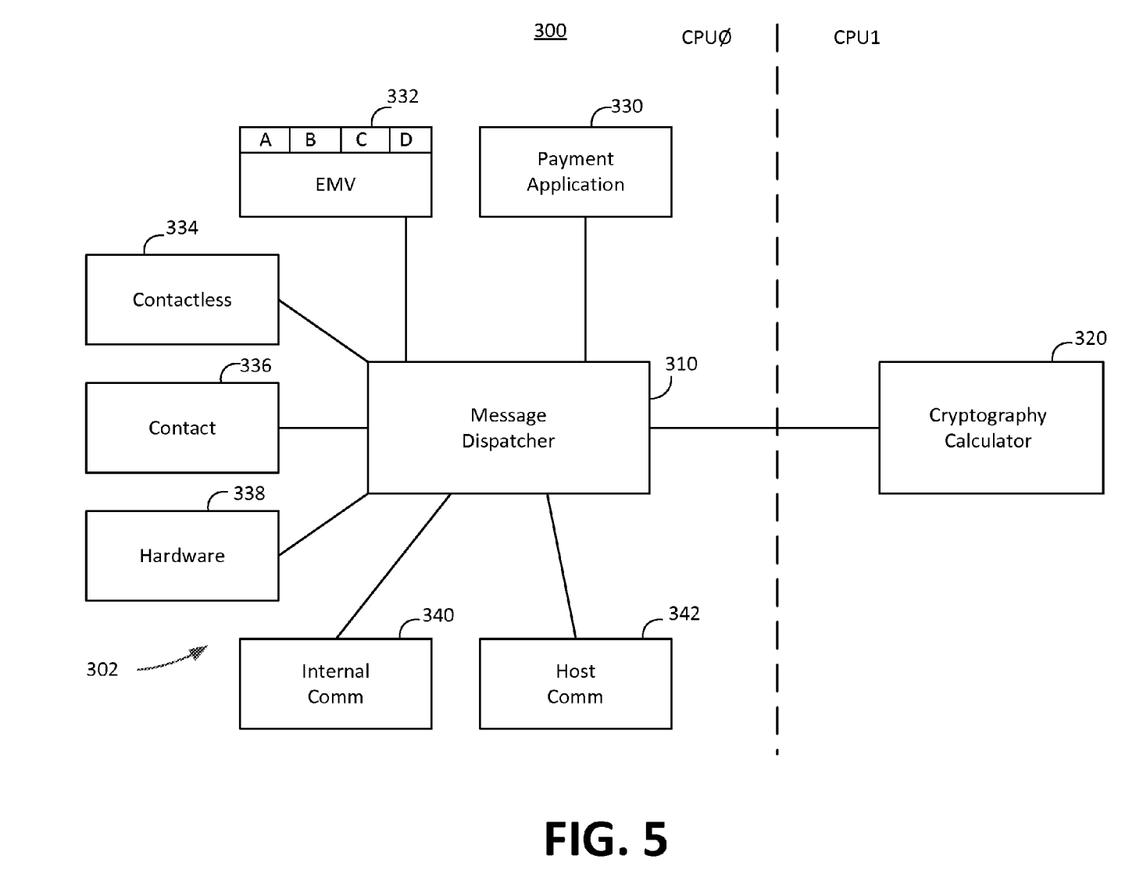
FIG. 5 depicts a software block diagram of a payment reader in accordance with some embodiments of the present disclosure.

FIG. 5 depicts a software block diagram 300 for a payment reader 22 in accordance with some embodiments of the present disclosure. Each block of software block diagram 300 represents a firmware module. Although particular firmware modules are depicted in FIG. 5, it will be understood that payment reader 22 may include additional firmware modules, or that one or more firmware modules may modified or removed. Moreover, while FIG. 5 depicts all of the firmware modules except for cryptography calculator 320 running on CPU0, with cryptography calculator 320 running on a separate processor CPU1, it will be understood that all of the firmware modules may run on a single CPU or may be allocated among a plurality of CPUs in any suitable manner.

In one embodiment, cryptography calculator 320 may be located on separate CPU (e.g., CPU1) such that cryptographic functions are executed separately from other functions of the NFC chip 102 of the payment reader 22. In addition, encryption keys and other high-value information may be accessed only by cryptography calculator 320 on CPU1. In this manner, high-value and secret information may be isolated from the remainder of the software of the NFC chip 102 and the payment reader 22.

Software system 302 includes a message dispatcher module 310 that manages the operations and interactions between the other firmware modules, which are functional modules. The functional modules may provide messages to the message dispatcher module 310. Message dispatcher module 310 manages those messages through a queued data structure mechanism and distributes the messages from the queued data structure to the functional modules. As described herein, a pointer may reference the location of a message in the queued data structure. Although the message may be provided to a functional module in any suitable manner (e.g., a copy of the message may be provided to a memory location that is accessed by the functional module), in one embodiment a reference to the pointer location may be provided to the functional module such that the functional module may access the memory location that is associated with the message within the queued data structure and, in some embodiments, edit data within the message such as one or more flags.

With respect to the software modules of CPU0, processing of CPU0 passes between the message dispatcher module 310 and a functional module, and the functional module executes its instructions until processing of CPU0 again returns to the message dispatcher module 310. In this manner, a message may be provided to one functional module at a time in a particular order. In one embodiment, the message dispatcher module may monitor message fields or flags to determine which of the functional modules should receive a message, whether the message should continue to be distributed to other functional modules, whether to distribute the message only once to each of the functional modules that is to receive the message, the order of distribution of the message to the functional modules, and whether the message should be returned to the queued data structure.

In one embodiment, the message dispatcher 310 implements the queued data structure as a circular queue having an array of messages or a linked list of messages, having respectively a pointer to the start of the queue (e.g., the top of front of the queue) and a pointer to the end of the queue (e.g., the bottom or end of the queue). Such a circular queue may be first-in first-out (FIFO) queue, with any new message that is to be enqueued inserted at the next location in memory after the last message in the queue. The end pointer is then modified to point to the location of the newly enqueued message. A message is discarded by moving the front pointer to from its current location to the next message at the front of the queue. The queue is circular in that it may wrap around the portion of memory that includes the queue, with old messages (i.e., messages that are not located between the start pointer and the end pointer) being overwritten as the pointers cycle through the circular queue. If the queue is full (i.e., the next message to be enqueued would overwrite the message stored at the location of the start pointer) additional memory may be allocated to the queue or an exception may be provided.

Although a circular queue (i.e., a queue) will be discussed in accordance with the embodiments described herein, it will be understood that any suitable queued data structure for storing messages and providing access to the messages may be provided. In another embodiment of a sequential queued data structure, the messaging system may be implemented as a push and pop stack. The push and pop stack may be a last-in first-out (LIFO) data structure in which any new message that is to be stored inserted at the location in memory before the first message in the stack. The stack may have an origin location and a pointer may point to the start of the queue. When a message is discarded, the pointer may be decremented toward the origin, and thus point to the next message. When a message is added to the stack, the pointer may be incremented away from the origin, and thus point to the newly added message. In an embodiment implementing a timed message that is returned to the queue as described herein, the contents of the stack may be modified to place the timed message at a location of the stack other than the start of the stack.

In some embodiments, a message is implemented as a message data structure, in memory, that includes a plurality of fields such as a message ID, a processed flag, and a data field. A message may have a message length and each field may be associated with a relative location within the message data structure. Once the location of the message within memory is known (e.g., based on a pointer), a particular field of a message may be accessed based on its relative location within the known message data structure. A message ID may indicate the type of message that is being sent. Based on this message ID, a functional module may determine whether to take action in response to a message and what action to take in response to the message. The processed flag may indicate to the message dispatcher module 310 that a message has been processed. The processed flag may be set by a functional module once the functional module completes processing in response to the message. Once the processed flag is set the message dispatcher module 310 may remove the message from the queue. The processed flag and/or other flags may also be used to indicate a processing error. A call me flag may indicate whether the module that provided the message should receive the message from the message dispatcher module. A data field may include data to be provided with a message for use by the functional module that takes action in response to the message. In some embodiments, the data field may include additional messages.

Message dispatcher module 310 may manage the queue in a different manner based on a message type. Although message dispatcher module 310 may process received messages according to any suitable message types, in one embodiment the message types may be a timed message and a standard message. A standard message may receive one-time processing within the queue. Once a standard message is processed, it may be removed from the queue. Until the standard message is processed, it may retain its position in the queue and move relative to the beginning of the queue (e.g., a pointer may move closer to the position of the standard message). A timed message may include a timing value and message distribution and queuing may be modified based on the timing value.

The timing value may be implemented in a number of ways. In one embodiment, the timed message may remain in the queue as long as the timing value has not expired and the processed flag is not set. When the timed message arrives at the start of the queue, it is distributed to the functional modules (e.g., a subset of the functional modules that are entitled to receive the timed message) in a round robin fashion until it has been sent to all of the functional modules that should receive the message or until a field of the message is modified and indicates that the message should no longer be distributed (e.g., by changing the timing value or a processed flag. In one embodiment, as long as none of the functional modules have set the processed flag and the timing value has not expired, the message is returned to the queue after being distributed to all of the functional modules that are supposed to receive the message (e.g., in some embodiments, only certain functional modules may receive timed messages, or the message may not be provided to the functional module that provided the message based on a call me flag). Other messages in the queue are then processed until the timed message returns to the start of the queue, at which time it is again distributed to the functional modules. If the processed flag is set, the timed message may be removed from the queue. If the timing value expires before the processed flag is set, this indicates that the timed message was not processed. The timed message may be removed from the queue and an error message or flag such as a payment failure message associated with the timed message may be generated.

In another embodiment, the timed message may be returned to the queue as long as the timing value is not expired. In one embodiment, the timing value is expired based on a creation time (e.g., a start time for the timed message) and a current time. The creation time may be subtracted from the current time, and if the result is greater than the timing value, the timing value is expired. Although a timing value may be implemented in any suitable manner, in other embodiments the timing value may count down, count up, or set a future time at which the timing value may expire. Once the timing value is expired, the timed message is distributed to one or more of the functional modules. If a functional module wishes to reset the timing value for the timed message, it can re-send the timed message, change a creation time associated with the timing value, or modify the timing value. If the timed message is to be removed from the queue, a processed flag may be set. In some embodiments, an error message or flag such as a payment failure message associated with the timed message may be generated.

In one embodiment of a circular queue, memory may be allocated for the queue and messages added to the next available location of the queue. When distributing a message, the message dispatcher module 310 provides a pointer to the location within the queue where the queued message is located. The functional modules can access the fields of a queued message such as the message ID field, processed flag, and data fields based on the pointer. In this manner, the message dispatcher module 310 provides the messages to the functional modules and the functional modules are able to update the queued messages. Once the queued message has been processed, removed, or moved to a different location of the queue, the pointer may be moved to the next queued message.

The functional modules may generate messages in response to messages received from message dispatcher module 310. In addition, processing of a functional module may be initiated within a module and messages generated in response to some external stimulus such as a hardware or software interrupt. In response to an interrupt, the processing of CPU0 206 may pass to the functional module that is initialized in response to the interrupt.

The functional modules may include one or more communication modules such as an internal communication module 340. Internal communication module 340 may include instructions for communicating with internal communication interfaces 220 of NFC chip 102 such as a USB interface, I$^2$C interface, SPI interface, UART interface, and GPIO interface. These interfaces may support communication with external devices (e.g., via the USB interface) or with internal hardware such as Wi-Fi, Bluetooth, or power control hardware. Communication with an external device or internal hardware of payment reader 22 may be initiated in any suitable manner, such as an interrupt provided via the communication interface. In response to the communication from the communication interface, internal communication module 340 may generate a message having a message ID and data that is indicative of the source of the communication, the data being communicated, and any other suitable information. These messages may be provided to message dispatcher module 310 to be distributed to one or more of the other functional modules. Internal communication module 340 may also receive messages to be transmitted to an external device or internal hardware of payment reader 22 from message dispatcher module 310. Such messages may have originated from other functional modules such as payment application module 330, host communication module 342, or hardware module 338.

Contactless module 334 may receive data to be transmitted and includes instructions for controlling near field communications between payment reader 22 and a payment device 10 such as NFC device 12 or chip card 14. Contactless module 334 provides for communications with such devices via a communication protocol such as those outlined in ISO14443 and ISO18092. Contactless module 334 may function as an initiator providing messages to the payment device 10 (e.g., the target). NFC Module 334 generates messages to facilitate communications with the payment device 10 via a modulated carrier signal and receives messages from a payment device 10 based on the payment device 10 modulating the carrier signal provided from an antenna of payment reader 22. These received messages may include payment information such as encrypted credit card numbers and in some embodiments may also include authentication information such as PIN numbers, fingerprint information, or other biometric information.

In some embodiments contactless module 334 may access messages from the queue of message dispatcher module 310 that may request information from payment device 10 or provide data to be sent payment device 10. For example, payment application module 330 may provide a message to the queue of message dispatcher module 310 that requests information relating to a limit for local processing of transactions. Contactless module 334 may access the message from the queue, and transmit a request for the local payment limit to the payment device 10 via the modulated carrier signal. Payment device 10 may respond with its payment limit by modulating the carrier signal. Contactless module 334 may generate a message based on the received data and provide the message to message dispatcher module 310. Message dispatcher 310 may distribute the message when it reaches the start of the queue, and payment application 330 may access this message to determine whether the local payment limit is less than the amount of the transaction. In other embodiments, contactless module 334 may provide data to be written to payment device 310, such as updates to payment parameters or keys of the payment device.

Contact module 336 may provide for communication with a contact device such as chip card 14. As described herein for contactless module 334, contact module 336 may interface with a payment device 10 and exchange messages with other functional modules of NFC software 302. Contact module 336 may communicate with chip card 14 via the contact interface of the payment reader 22 and with the other functional modules via messages sent to or accessed from the queue of message dispatcher module 310.

Although any suitable functional modules may utilize timed messages, in some embodiments, both contactless module 334 and contact module 336 may utilize timed messages during operation. For example, upon receiving a message to receive payment information from the payment device 10, contactless module 334 and contact module 336 may each provide a timed message to message dispatcher 310. This timed message may periodically arrive at the start of the queue at which time the message is distributed based on the timing value and it is determined by contactless module 334 or contact module 336 whether the payment information has been received. If the payment information has been received or if the functional module determines that processing of the timed message should end, the module receiving the payment information may modify the processed flag of the timed message and provide a message to the queue of message dispatcher model 310 indicating that the payment information has been received or a payment error has occurred. In one embodiment, until the payment information has been received or the timer runs out, the timed messages may continue to be distributed and returned to the queue. In another embodiment, the timing value may correspond to an amount of time during which payment information should have been received, and the timed message may only be sent to the functional modules once the timing value has expired. The timed message may then continue to be distributed or the timing value may be reset (e.g., by updating a creation time or timing value of the timed message), until the processed flag indicates that processing of the timed message should end. In some embodiments, an error message such as a payment failure message associated with the timed message may be generated.

NFC software 302 may also include a communication module such as a host communication module 342 for communicating with a host application. In one embodiment, a host application may be running on a different processor than NFC chip 102. For example, the host application may be running on another processor of payment reader 22, or in some embodiments as described herein, may be running on a merchant device 29. Although processing operations may be distributed between NFC software 302 and an external host application in any suitable manner, in one embodiment the host application may control user interface functions and communication with external devices such as payment server 40. NFC software 302 may handle payment processing (e.g., via payment application module 330 and EMV module 332), may interface with payment devices (e.g., via contactless module 334 and contact module 336), and may encrypt data that is to be transmitted to a payment server 40 (e.g., via cryptography calculator module 320). The instructions of host communication module 342 process data received from the host application, generate messages relating to the operation of the functional modules, and generate messages to be sent to the host application based on received messages.

Hardware module 338 may include instructions for communicating with internal hardware of payment reader 22. When a communication is received from internal communication module 340, and a message relating to that communication is queued at message dispatcher module 310, hardware module 338 may determine whether that message is from an internal component of payment reader 22. If the message is from an internal hardware component of payment reader 22, hardware module 338 may process the message and data and generate a responsive message to be queued at message dispatcher module 310 for processing by one or the other functional modules.

Payment application module 330 includes instructions for processing payment at payment reader 22. Payment application module 330 communicates with the host application via host communication module 342 and internal communication module 340 and also coordinates the operations of the functional modules that are used for payment processing (e.g., cryptography calculator module 320, EMV module 332, contactless module 334, and contact module 336). For example, when a payment transaction is initiated by a host application, payment application module 330 may retrieve a queued message from message dispatcher module 310 (e.g., that was initiated from host communication model 342) and processes the request for payment. Payment application module 330 may generate a message or messages to initialize one or more of contactless module 334 and contact module 336 to receive payment information (e.g., from an NFC device 12 or chip card 14).

When a message indicating that payment information was received arrives at the queue of message dispatcher module 310 and is received by payment application module 330, payment application module 330 may generate a message to access one or more transaction processing modules (indicated as A, B, C, and D) of EMV module 332. For example, each of the transaction processing modules A-D may correspond to a payment platform such as Europay, MasterCard, Visa, or American Express. Payment application module 330 may continue to communicate with the transaction processing module of EMV module 332 via queued messages at message dispatcher module 310, and may also provide messages that are accessed by cryptography calculator module 320. In some embodiments, payment application module 330 may process a transaction locally (e.g., for low value transactions), or in some embodiments may facilitate communications with a payment server 40 via merchant device 29. In either case, payment application module 330 may provide messages to message dispatcher module 310 that are accessed by host communication module 342, which communicates the results of the transaction approval process to the host application running on the merchant device 29 (e.g., via a Bluetooth connection accessed through internal communication module 340).

EMV module 332 includes instructions for processing payment transactions in accordance with one or more transaction processing procedures specified by a payment processor such as Europay, MasterCard, Visa, American Express, and other issuing companies. When payment information is received from contactless module 334 or contact module 336, payment application 330 may determine which transaction processing module to access from EMV module 332. Transaction processing modules of EMV module 332 (e.g., depicted in FIG. 5 as A, B, C, and D) are required to conform to specifications of the issuing company. Conformance with the specifications by processing modules of EMV module 332 may be confirmed by a certification process. EMV module 332 accesses the requested transaction processing module and communicates with other functional modules via messages queued at message dispatcher module 310.

Cryptography calculator module 320 includes instructions for performing cryptographic functions for payment processing transactions. Cryptography calculator module 320 may have access to keys that may be used to encrypt information that is sent to an external device such as payment server 40. Functional modules such as payment application module 330 and EMV module 332 may provide messages to the queue of message dispatcher 310 that cryptography calculator 320 may access. The messages that are accessed may include data to be encrypted. Cryptography calculator module 320 may perform the encryption on a separate processor (e.g., CPU1). Cryptography calculator module 320 may then generate a message including the encrypted data and provide that message to the queue of message dispatcher module 310. That message may be accessed from the queue (e.g., by payment application module 330) and eventually communicated to the payment server 40 (e.g., via messages provided to the queue of message dispatcher module 310 from payment application module 330, host communication module 342, and internal communication module 340, and via merchant device 29 to network 30).

Figure 6:
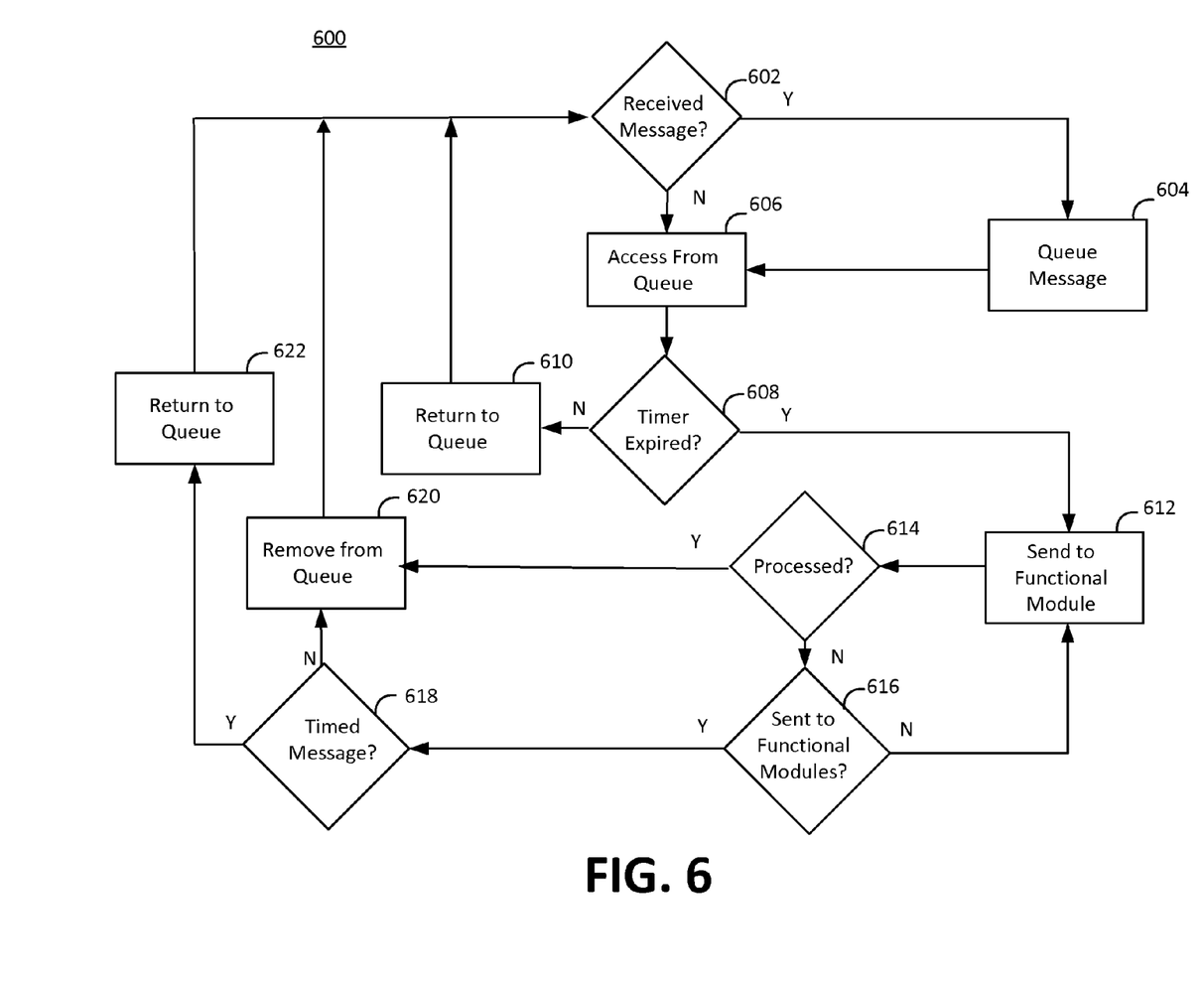
FIG. 6 depicts a non-limiting flow diagram illustrating exemplary steps for processing messages with a message dispatcher module and functional modules in accordance with some embodiments of the present disclosure.

In view of the structures and devices described supra, methods that can be implemented in accordance with the disclosed subject matter will be better appreciated with reference to the flowchart of FIG. 6. While, for purposes of simplicity of explanation, the methods are shown and described as a series of steps, it is to be understood and appreciated that such illustrations or corresponding descriptions are not limited by the order of the steps, as some steps may occur in different orders and/or concurrently with other steps from what is depicted and described herein. Any non-sequential, or branched, flow illustrated via a flowchart should be understood to indicate that various other branches, flow paths, and orders of the steps, can be implemented which achieve the same or a similar result. Moreover, not all illustrated steps may be required to implement the methods described hereinafter.

FIG. 6 depicts steps 600 for processing messages with message dispatcher module 310 and functional modules according to some embodiments of the present disclosure. At step 602, message dispatcher module 310 may determine whether any messages have been received. As described herein, messages may be received from one or more functional modules in response to messages that were processed by the functional modules, interrupts, or other suitable processing. If a message has been received, processing may continue to step 604. If a message has not been received, processing may continue to step 606.

At step 604, the received message may be queued by message dispatcher module 310. In one embodiment, the queue may be a circular queue, such that the most recently received message is placed at the end of the queue. In other embodiments, queued messages may be organized differently, for example, such that the most recently received message is placed elsewhere such as at the start of the queue. In some embodiments, the queue may be adjusted based on the contents of one or more fields of the received message (e.g., setting a message priority), or based on any other suitable method. Once the message has been queued, processing may continue to step 606.

At step 606, message dispatcher module 310 may access a message to be processed from the queue. Although a message may be accessed in any suitable manner, in one embodiment a pointer may point to the position that corresponds to the message at the start of the queue. In accessing the queue, the message dispatcher module 310 may access one or more fields of the message such as a message ID, a message length, a call me field, a processed flag, and a data field. In some embodiments, one or more of these fields may be used by the message dispatcher module 310 to determine whether or how the message should be distributed to the functional modules. For example, a field value or a message ID may include information indicating that a message is a timed message. Based on the status of the call me field, the message dispatcher may not distribute the message back to the functional module that provided the message. Once message dispatcher module 310 has accessed the message from the queue, processing may continue to step 608.

At step 608, message dispatcher module 310 may determine whether the current message is a timed message and whether that message should be returned to the queue without being processed. In one embodiment, the message ID field may include message IDs that correspond to whether or not a message is timed. For example, certain types of messages from payment application module 330, EMV module 332, contactless module 334, or contact module 336 may be timed messages. In other embodiments, the message may include a field to indicate whether the message is a timed message. A timed message may enable certain processing to be performed at a particular interval, on a periodic basis, or in a delayed manner, according to a timing value. This may enable certain processing functions to occur concurrently and without consuming unnecessary processing time. For example, once the contact module 336 or contactless module 334 is initiated to search for a chip card or NFC device, it may be desired that processing of CPU0 206 return to process other messages concurrently. The contact module 336 and contactless module 334 include hardware and software that may operate while other messages are being processed, and processing may pass to the contact module 336 or contactless module 334 to check for a chip card or NFC device based on the timing value. If the message is not a timed message, processing may continue to step 612. If it is a timed message, it may be determined whether the timing value is expired.

If message dispatcher module 310 determines that the message is a timed message, the message dispatcher module 310 may also determine whether to the timing value is expired. In one embodiment, the timed message may be returned to the queue until the timing value of the timed message is expired, and only distributed again once the timing value has expired. In this manner, the timed message does not pass to the functional module for processing (e.g., to contact module 336 or contactless module 334) until the timing value is expired. In one embodiment, expiration of the timing value may be based on a creation time value and a timing value that are set by the functional module that generates the timed message. The message dispatcher module 310 may determine the current time that it is accessing the message at the queue, and subtract the creation time from the current time. If the result is less than the timing value, the timed message may be returned to the queue without being sent to any functional modules. If the result is greater than (or in some embodiments, greater than or equal to) the timing value, the timed message may be sent to the functional modules that are supposed to receive the timed message (e.g., based on a field of the timed message or a message ID). In this manner, the interval for the timed message can be controlled based on the timing value and the creation time. For example, the lower the timing value, the sooner the timed message will be sent to the functional modules. By modifying or resetting the creation time or timing value, the time until expiration can be extended. If the timing value is expired, processing may continue to step 612. If the timing value is not expired, processing may continue to step 610.

In another embodiment (not depicted in FIG. 6), a timed message may be provided to the targeted functional modules each time it arrives at the start of the queue. In this other embodiment, the timing value may not be checked at step 608, and may only be checked after the message has been distributed to the functional modules (e.g., at step 618). Thus processing would skip to step 612.

At step 610, message dispatcher module 310 may return the timed message to the queue. Although the timed message may be returned to any suitable location of the queue in any suitable manner, in one embodiment the timed message may be returned to the end of the queue. Once the timed message is returned to the queue, processing may return to step 602.

At step 612, message dispatcher module 310 may send the message to a functional module. In one embodiment, message dispatcher module 310 may send the functional module a pointer to the message location with the queue. In some embodiments, the message may only be sent to certain of the functional modules (e.g., a timed message may only be distributed to certain functional modules based on a message ID or message field). Messages may be provided to the functional modules in a round robin fashion (e.g., at each iteration of step 612 within the loop of steps 612, 614, and 616) with the functional module that receives the message determining (e.g., based on the message ID) whether to take any action in response to the message. If the functional module takes action in response to the message, control of the processing of the processor (e.g., CPU0 206) may pass to the functional module. Processing performed by the functional module may include processing the data in the message according to the message ID, generating messages that are provided to the message dispatcher, modifying the processed flag, or any other suitable processing. Once the functional module has completed its processing, control of the processing of CPU0 206 may return to the message dispatcher module 310 which may determine whether the message was processed at step 614.

At step 614, message dispatcher module 310 may determine whether the current message in the queue has been processed. In one embodiment, message dispatcher module 310 may determine whether the message has been processed based on the status of processed flag associated with the message. For example, once a functional module receives a message with a message ID that requires processing by the functional module, and the functional module completes that processing, the functional module may modify the processed flag based on the known location of that flag within the message. If the message dispatcher module 310 determines that the message has already been processed (e.g., based on the status of the processed flag), processing may continue to step 620. If the message dispatcher module 310 determines that the message has not been processed, processing may continue to step 616.

At step 616, message dispatcher module 310 may determine whether a message has been sent to all functional modules entitled to receive the message. Initially, a message will not have been sent to any of the functional modules. Processing will continue to steps 612, 614, and 616, during which the message is sent to the functional modules that are to receive the message (at step 6012), the processed flag is checked (at step 614), and it is determined whether the message was sent to all functional modules entitled to receive the message (step 616). This loop may continue until the message dispatcher module determines either that the message has been processed (e.g., based on the status of the processed flag) or the message has been sent to all functional modules that are entitled to receive the message (e.g., for timed messages or if the call me flag is not asserted, the message is not sent to all of the functional modules). Once the message has been sent to all functional modules that are entitled to receive the message, processing may continue to step 618. As long as the message has not been sent all functional modules entitled to receive the message, processing returns to step 612.

At step 618, message dispatcher module 310 may determine whether the current message is a timed message. As described herein, this may be determined based on a message ID field, a field to indicate whether the message is a timed message, or in any other suitable manner. If the message is a timed message, processing may continue to step 622 for the message to be returned to the queue. If the message is not a timed message, processing may continue to step 620 for the message to be removed from the queue.

In another embodiment (not depicted in FIG. 6), a timed message may be provided to the functional modules each time it arrives at the start of the queue and returned to the queue so long as the timing value has not expired and the processed flag has not been set. It is then returned to the queue as long as the processed flag is not set for that message and as long as the timing value is not expired. A timing value configured in this manner may allow for periodic polling of the functional modules until a time limit represented by the timing value is met. If the timing value expires (e.g., without being reset during processing by a functional module), an error message such as a payment failure message associated with the timed message may be generated. In this other embodiment, the timing value may not be checked at step 608, and may only be checked after the message has been distributed to the functional modules (e.g., at step 618). In this other embodiment, if the timing value is not expired at step 618, processing may continue to step 622. If the timing value is expired, processing may continue to step 620.

At step 620, message dispatcher module 310 may remove the processed message from the queue. Although the processed message may be removed from the queue in any suitable matter, in one embodiment, message dispatcher module 310 may adjust the pointer to point to the next message in the queue. The processed message may eventually be overwritten based on other messages entering the queue. Processing may then return to step 602.

At step 622, message dispatcher module 310 may return the timed message to the queue. Although the timed message may be returned to any suitable location of the queue in any suitable manner, in one embodiment the timed message may be returned to the end of the queue. In addition, in some embodiments the timing value and/or creation time of a timed message may be modified or reset by one or more functional modules. For example, the creation time or timing value may be reset or modified to extend the time until the next expiration of the timing value at step 608. Once the timed message is returned to the queue, processing may return to step 602.

The foregoing is merely illustrative of the principles of this disclosure and various modifications may be made by those skilled in the art without departing from the scope of this disclosure. The above described embodiments are presented for purposes of illustration and not of limitation. The present disclosure also can take many forms other than those explicitly described herein. Accordingly, it is emphasized that this disclosure is not limited to the explicitly disclosed methods, systems, and apparatuses, but is intended to include variations to and modifications thereof, which are within the spirit of the following claims.

As a further example, variations of apparatus or process parameters (e.g., dimensions, configurations, components, process step order, etc.) may be made to further optimize the provided structures, devices and methods, as shown and described herein. In any event, the structures and devices, as well as the associated methods, described herein have many applications. Therefore, the disclosed subject matter should not be limited to any single embodiment described herein, but rather should be construed in breadth and scope in accordance with the appended claims.

What is claimed is:

1. A payment reader for processing transactions between a contactless device or a chip card and a point-of-sale application running on a seller mobile device, the payment reader comprising:
    a contactless interface configured to communicate with the contactless device;
    a contact interface configured to receive the chip card and communicate with the chip card;
    a wireless communication interface configured to communicate with the seller mobile device;
    a memory comprising a plurality of firmware modules, wherein the plurality of firmware modules comprise a message dispatcher module and a plurality of functional modules, wherein the functional modules comprise a contactless module associated with the contactless interface, a contact module associated with the contact interface, a communication module associated with the wireless communication interface, a transaction processing module, and a cryptography module; and
    a processor configured to execute instructions in the message dispatcher module and the plurality of functional modules, wherein the processor is configured to generate a queue for messages based on instructions associated with the message dispatcher module, wherein the processor is configured to execute functional instructions associated with one or more of the functional modules and provide one or more messages to the queue based on the executed functional instructions, and wherein the processor is configured to:
        receive a request to receive payment information from the point-of-sale application via the wireless communication interface;
        generate a first message based on the request to receive payment information, wherein the first message includes a request to receive payment information from one or more of the contactless interface or the contact interface;
        store the first message in the queue based on instructions of the message dispatcher module, wherein the first message is a timed message that includes a timing value;
        receive one or more additional messages based on instructions of one or more of the functional modules, wherein the one or more additional messages are standard messages;
        store the one or more additional messages in the queue based on the instructions of the message dispatcher module;
        provide the first message to one or more of the contactless module or the contact module based on the instructions of the message dispatcher module and the timing value;
        return the first message to the queue based on the timing message, a flag associated with the first message, and the instructions of the message dispatcher module, wherein the timing message and the flag associated with the first message indicate that processing of the first message should continue;
        provide the one or more additional messages to one or more of the functional modules based on the position of each of the one or more additional messages in the queue and the instructions of the message dispatcher module;
        provide the returned first message to one or more of the contactless module or the contact module based on the position of the returned first message in the queue, the timing value, and the instructions of the message dispatcher module; and
        remove the returned first message from the queue based the timed message or the flag associated with the first message, wherein one or more of the timed message and the flag associated with the first message indicate that processing of the returned first message should end.

2. The payment reader of claim 1, wherein the processor is configured to remove the returned first message from the queue based on the flag associated with the first message and the instructions of the message dispatcher module, wherein the flag indicates that processing associated with the returned first message is complete, and wherein the flag was set by one of the contactless module or the contact module.

3. The payment reader of claim 1, wherein the processor is configured to provide the first message to at least the contactless module and the contact module if the timing value is expired based on the instructions of the message dispatcher module.

4. The payment reader of claim 1, wherein the first message comprises a message identifier, and wherein the request to receive payment information from one or more of the contactless interface or the contact interface is associated with the message identifier.

* * * * *